United States Patent

[11] 3,626,284

[72] Inventor Aloysius Bak
 Davenport, Iowa
[21] Appl. No. 848,240
[22] Filed Aug. 7, 1969
[45] Patented Dec. 7, 1971
[73] Assignee The Bendix Corporation

[54] APPARATUS FOR MEASURING CHANGES IN MICROWAVE FREQUENCIES CORRESPONDING TO THE DENSITY OF A FLUID
3 Claims, 3 Drawing Figs.

[52] U.S. Cl. .................................................. 324/58.5 B
[51] Int. Cl. .................................................. G01r 27/04
[50] Field of Search ........................................... 324/58, 58.5; 73/304

[56] References Cited
UNITED STATES PATENTS
3,403,335 9/1968 Couper et al. ............... 324/58
3,474,337 10/1969 Petrick ........................ 324/58.5

Primary Examiner—Edward E. Kubasiewicz
Attorneys—Plante, Arens, Hartz, Hix & Smith and William N. Antonis ABSTRACT: An apparatus for measuring the density of a dielectric fluid retained in a vessel. A waveguide is inserted into the liquid through a sealed opening in the vessel. The waveguide has a center conductor concentrically positioned in the waveguide. The center conductor carries a microwave frequency emitted from a source to a disc on the bottom of the waveguide where a fixed node of the microwave frequency occurs. A detector member immersed in the fluid is fixed to the waveguide a predetermined distance from the bottom of the waveguide to receive a node of the standing wave created by the microwave frequency. With a change in the fluid density, the node adjacent the detector member will correspondingly shift with the detector member receiving a different electromagnetic field intensity created by a microwave energy source transmitted through the waveguide. The detector member will communicate all measurements of the electromagnetic field intensity to an indicator where density changes can be directly read from a scale.

INVENTOR.
ALOYSIUS BAK
BY
Plante, Arens, Hartz, Hix and Smith
ATTORNEY

3,626,284

APPARATUS FOR MEASURING CHANGES IN MICROWAVE FREQUENCIES CORRESPONDING TO THE DENSITY OF A FLUID

SUMMARY OF THE INVENTION

It is an object of this invention to provide an improved fluid density indicating system.

Another object of this invention if to provide a fluid density indicating system having improved sensitivity and accuracy.

A further object of this invention is to provide a fluid density indicating system employing microwave techniques.

More specifically, it is an object of this invention to provide a fluid density indicating system having waveguide means, one end of which is immersed in said fluid and the other end of which is connected to a source of microwave energy, said system including detector means connected to said waveguide means and immersed in said fluid.

Other objects and features of the invention will be apparent from the following description of the fluid density indicating system taken in connection with the accompanying drawing.

DESCRIPTION OF THE PREFERRED EMBODIMENT

Figures 1, 2, 3:
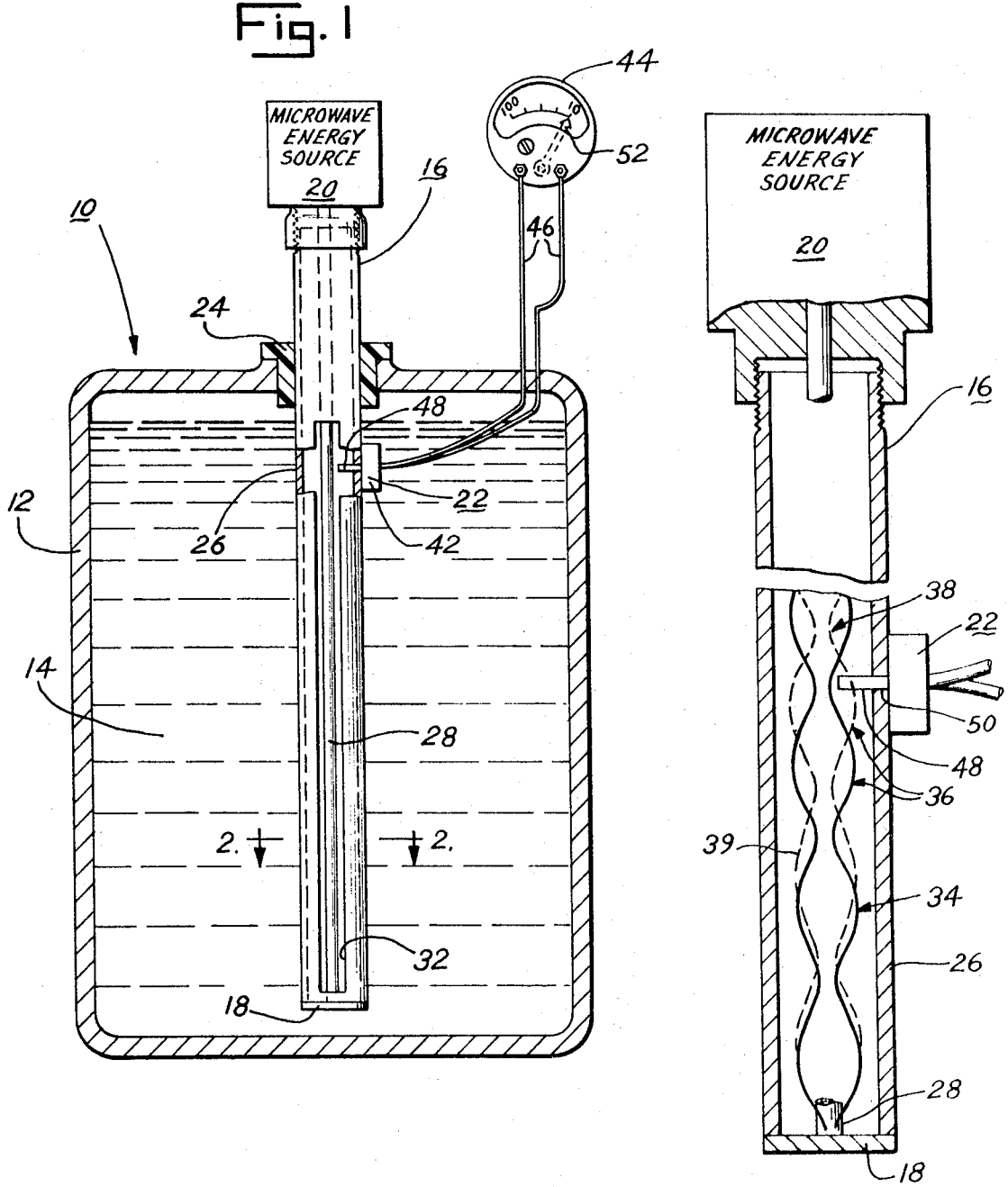
FIG. 1 is a side view, partially in section, depicting the fluid density indicating system of this invention.
FIG. 2 is a sectional view taken along line 2—2 of FIG. 1.
FIG. 3 is an enlarged view, partially in section, taken along the longitudinal axis of the waveguide means to pictorially shown the electrical operation of the system.

Referring now to the drawing, and particularly FIG. 1, a fluid density indicating system is generally identified by the numeral 10. The fluid density indicating system 10 is comprised of a vessel 12 containing a fluid 14, waveguide means 16, shorting means 18, a source of microwave energy 20, and detector means 22.

Although the vessel 12 is shown as a generally cylindrically shaped closed container, other shapes or configurations may, of course, be used. As will be understood by those skilled in the art, the fluid 14 must be of a type in which the density is a single-valued function of the relative dielectric constant and which is not flammable or combustible when exposed to the source of microwave energy 20. It is further noted that the detector means 22 must be totally immersed in the fluid 14. The source of microwave energy 20 may be selected for any particular application and could, of course, be varied from application to application. More specifically, the source of microwave energy 20 could be comprised of electromagnetic radiation of wavelengths from submillimeter through those greater than 30,000 meters.

The waveguide means 16 is comprised of a plug or guide member 24 which carries and vertically positions an outer element 26 of the wave guide means 16. As shown best in FIG. 2, the outer element 26 carries an inner element 28 via a dielectric support 30. As may now be seen by those skilled in the art, the outer element 26 and the inner element 28 are concentrically positioned by the dielectric support 30 to form a coaxial waveguide of the waveguide means 16. The shorting means 18, being of a generally disc shape, is attached to the end of the coaxial waveguide which is immersed in the fluid 14. The shorting disc or means 18 is structurally and electrically connected to both the outer element 26 and the inner element 28 to provide a high-frequency short therebetween. The outer element 26 is also provided with axial openings or slots 32 of predetermined size to allow communication of the fluid 14 into the interior of the coaxial waveguide 16; i.e., into the space between the inner and outer elements, 28 and 26, respectively.

The other end of the waveguide means 16 has mounted thereto the source of microwave energy 20. The source of microwave energy is positioned so as to emit electromagnetic radiation into the coaxial waveguide 16. The microwave energy will travel down the coaxial waveguide 16 through the medium above the surface of the fluid (for example air), into the fluid 14, past the detector means 22, and through additional fluid 14 until it reaches the shorting means 18 where further travel is precluded by the high-frequency short between the inner and outer conductors, 28 and 26, respectively. As will be understood by those skilled in the art, the emission of microwave energy into the coaxial waveguide 16 will produce a standing wave 34 which is shown in graphical form in FIG. 3. The standing wave 34 may be shown as having voltage amplitude maximums or antinode 36 and minimums or nodes 38 along progressive positions of the coaxial waveguide 16. The distance between adjacent nodes is determined by the frequency of the microwave energy and the properties of the fluid. The location of the nodes is determined by the fact that a node must exist at the shorting means at all frequencies with any fluid.

The detector means 22 is comprised of an electric field intensity sensitive element 42 and an indicating element 44 electrically connected by conductors 46 to the field intensity sensitive element 42. The electric field intensity sensitive element 42 includes a probe 48 and is mounted to the outer element 26 of the coaxial waveguide 16 such that the probe 48 projects through an opening 50 into the interior of the waveguide 16, as may be best seen in FIG. 3. As clearly seen in FIG. 1, the electric field intensity sensitive element 42, including its probe 48, is mounted such that it is fully immersed in the fluid 14. It is important to note that the probe 48 must be mounted so that a node 38 of the standing wave 34 appears at the exact position of the probe 48 when the fluid density reaches one of its extreme values, as shown in FIG. 3 for reasons to be more fully explained hereinafter.

Regarding the mode of operation of the fluid density indicating system 10, assume that the vessel 12 is filled as shown in FIG. 1, with fluid 14, and that the source of microwave energy 20 is energized, and thus emitting microwave energy. One of the nodes 38 of the standing wave 34 will be located at the exact position of the probe 48 so that the pointer 52 of the indicating element 44 is deflected to align with a predetermined numerical indication of the density of the fluid (shown in FIG. 1 as a numeral 10). As the density of the fluid 14 changes, the relative dielectric constant changes and hence the distance between adjacent nodes changes. Since the node at the shorting means cannot change its position, the nodes 38 of the standing wave 34 shift, as shown by the dotted curves in FIG. 3. This shift in the position of the nodes causes the probe 48 and thus the electric field intensity sensitive element 42 to see an increased electric field intensity, which causes the indicating element to rotate or move pointer 52 to the left to indicate a change in fluid density. As will be further understood by those skilled in the art, the selection of the indicating element 44, the electric field intensity sensitive element 42, the waveguide means 16, and the source of microwave energy 20 is such that the pointer 52 aligns itself with another predetermined numerical indication of the density of the fluid after numerical indication (shown in the drawing as the numeral 100) to give the indicating system 10 a preselected range of measuring capability.

While the specific details have been herein shown and described, the invention is not confined thereto, as other substitutions can be made within the spirit and scope of the invention.

I claim:

1. An apparatus for directly measuring any change in the density of a fluid, comprising:

a vessel for holding a quantity of said fluid;

waveguide means having one end which extends through an orifice in said vessel and into said fluid, said vessel retaining said waveguide means in a fixed position in said fluid, said waveguide means having openings therein to permit said fluid to freely pass to the interior thereof;

means connected to the other end of said waveguide means for emitting microwave energy into said waveguide means at a predetermined frequency;

shorting means located in the interior of said waveguide means for creating a fixed node position for the frequency of the microwave emitted within said waveguides; and detector means secured to said waveguide means in said fluid a predetermined distance from said shorting means, said predetermined distance being selected for the frequency of the microwave to create a standing node adjacent said detector means, said detector means measuring the electromagnetic field created by said microwave energy in said fluid as a function of said standing node, said standing node shifting along the interior of said waveguide means with a change in the frequency of the emitted microwave energy caused by a variance in the density of the fluid in the vessel, said node-shifting creating a different electromagnetic field within the interior of said waveguide means, said detector means responding to said shifting in the standing node to indicate a corresponding change in the density of the fluid in the vessel.

2. The apparatus, as recited in claim 1, further including:

indicating means responsive to said detector means for providing evidence of a change in the density of the fluid.

3. The apparatus, as recited in claim 2, wherein said indicating means includes:

a pointer member retained in a housing over a numerical scale, said pointer member being responsive to the change in electromagnetic field intensity measured by said detector to give an operator a visual indication of any fluid density change.

* * * * *